US012151918B2

(12) United States Patent
Feß et al.

(10) Patent No.: US 12,151,918 B2
(45) Date of Patent: Nov. 26, 2024

(54) VEHICLE CRANE HAVING A TELESCOPING JIB WITH A SECURING AND LOCKING UNIT

(71) Applicant: Tadano Demag GmbH, Zweibrücken (DE)

(72) Inventors: Traugott Feß, Bechhofen (DE); Johannes Untch, Offenbach (DE); Simon Schneider, Martinshöhe (DE); Achim Schütz, Nünschweiler (DE); Martin Bauer, Steinwenden (DE)

(73) Assignee: Tadano Demag GmbH, Zweibrücken (DE)

( * ) Notice: Subject to any disclaimer, the term of this patent is extended or adjusted under 35 U.S.C. 154(b) by 325 days.

(21) Appl. No.: 17/725,198

(22) Filed: Apr. 20, 2022

(65) Prior Publication Data

US 2022/0340400 A1 Oct. 27, 2022

(30) Foreign Application Priority Data

Apr. 23, 2021 (DE) ......................... 102021110430.0

(51) Int. Cl.
*B66C 23/70* (2006.01)

(52) U.S. Cl.
CPC .......... *B66C 23/708* (2013.01); *B66C 23/705* (2013.01)

(58) Field of Classification Search
CPC .............................. B66C 23/708; B66C 23/54
See application file for complete search history.

(56) References Cited

U.S. PATENT DOCUMENTS

| | | | | |
|---|---|---|---|---|
| 4,433,515 A * | 2/1984 | Mentzer | B66C 23/708 212/292 |
| 10,640,339 B2 | 5/2020 | Martin et al. | |
| 10,640,340 B2 | 5/2020 | Kuhn et al. | |
| 10,647,553 B2 | 5/2020 | Martin et al. | |
| 10,781,083 B2 | 9/2020 | Kuhn et al. | |
| 2015/0060385 A1* | 3/2015 | Matsuda | B66C 23/708 212/349 |
| 2020/0024111 A1* | 1/2020 | Heidrich | B66C 23/708 |

FOREIGN PATENT DOCUMENTS

| | | |
|---|---|---|
| DE | 102010022865 A1 | 12/2011 |
| DE | 202018102111 U1 | 4/2018 |
| DE | 102018117630 B4 | 7/2020 |

OTHER PUBLICATIONS

Co-pending U.S. Appl. No. 17/523,063, filed Nov. 10, 2021.
Co-pending U.S. Appl. No. 17/534,597, filed Nov. 24, 2021.

* cited by examiner

*Primary Examiner* — Sang K Kim
*Assistant Examiner* — Nathaniel L Adams
(74) *Attorney, Agent, or Firm* — Gardner, Linn, Burkhart & Ondersma LLP

(57) ABSTRACT

A vehicle crane having a telescoping jib, comprising a basic box with retractable and extendible inner boxes and a securing and locking unit that comprises a first adjusting cylinder and a second adjusting cylinder which are each designed as unilaterally acting hydraulic cylinders with a first spring element and a second spring element as well as a first line and a second line, where the first adjusting cylinder moves locking bolts between operating states of unbolted and bolted and the second adjusting cylinder moves driving bolts between operating states of secured and released. In the event of a malfunction, the first adjusting cylinder moves to the bolted operating state and the second adjusting cylinder moves to the released operating state.

19 Claims, 8 Drawing Sheets

VEHICLE CRANE HAVING A TELESCOPING JIB WITH A SECURING AND LOCKING UNIT

CROSS REFERENCE TO RELATED APPLICATION

The present application claims the priority benefits of German patent application no. 10 2021 110 430.0, filed Apr. 23, 2021.

BACKGROUND AND FIELD OF THE INVENTION

The invention relates to a vehicle crane having a telescoping jib, comprising a basic box with retractable and extendible inner boxes and a securing and locking unit which comprises a first adjusting cylinder and a second adjusting cylinder which are each designed as unilaterally acting hydraulic cylinders with a first spring element and a second spring element as well as a first line and a second line, wherein the first adjusting cylinder moves locking bolts between operating states of unbolted and bolted and the second adjusting cylinder moves driving bolts between operating states of secured and released.

A locking device for a telescoping jib of a mobile crane is already known from German patent specification DE 10 2018 117 630 B4. The telescoping jib consists typically of a basic box which accommodates a plurality of inner boxes which are arranged telescopically one inside the other and can be extended and retracted hydraulically via a telescoping cylinder. The locking device which is also often referred to as a securing and bolting unit is arranged at a free end of a cylinder housing of the telescoping cylinder. The telescoping cylinder per se is supported at a foot-side end of the basic box with its piston rod. The locking device consists essentially of a first hydraulic adjusting cylinder for a driving bolt, of a second hydraulic adjusting cylinder for a locking bolt and of a control device in order to hydraulically activate the two adjusting cylinders. The two adjusting cylinders have springs in the cylinder on the rod end and are connected to the hydraulic supply on the bottom end. For this purpose, the control apparatus draws hydraulic energy from a rod-end cylinder chamber of the telescoping cylinder, said energy being intermediately stored in a high-pressure accumulator in the control device. The locking device can be connected via the driving bolt to an inner box to be retracted or extended. The locking bolt arranged on the respective inner box has the task of bolting an inner box to an adjacent basic box or an inner box in a desired extension or retraction position. The two adjusting cylinders draw their adjusting energy from the high-pressure accumulator as required via corresponding first and second two-way valves. In the non-actuated inoperative state and thus also in the event of a malfunction, the two two-way valves disconnect the adjusting cylinders from the high-pressure accumulator and the first and second two-way valves connect the adjusting cylinders to the telescoping cylinder via a return line. A bypass line runs in parallel with the return line and is closed via a third two-way valve during normal operation. In the non-actuated inoperative state and thus also in the event of a malfunction, this third two-way valve in the bypass line connects the rod-end cylinder chamber of the telescoping cylinder via the first two-way valve to the adjusting cylinder of the driving bolt. In the event of a malfunction of the control device, the three two-way valves assume their inoperative position, in which the first and second two-way valves connect the adjusting cylinders to the return line and the third two-way valve opens the bypass line. If, at the point in time of the malfunction, the telescoping cylinder is in an operating position which is difficult to access and e.g. the driving bolt is connected to one of the inner boxes via the associated adjusting cylinder, the telescoping cylinder can be pressurised when a preset switching pressure is achieved and as a result the driving bolt can be detached from the inner box via the bypass line. The telescoping cylinder can then be retracted to an inspection or repair position. If the preset switching pressure is not achieved, the telescoping cylinder only retracts without releasing the adjusting cylinder for the driver bolt via the bypass line.

Since the locking device with the control device and the adjusting cylinders are arranged at the upper end of the telescoping cylinder, they are difficult to access in the event of a malfunction during operation of the telescoping jib. This can cause problems during the retraction of the telescoping jib until the recovery thereof with considerable outlay.

A further locking unit for a telescoping cylinder of a mobile crane having a telescoping jib, comprising a basic box and a plurality of inner boxes is known from utility model specification DE 20 2018 102 111 U1. The locking unit consists of a housing and at least one cylinder bolt which can be moved linearly within the housing for locking and unlocking the locking unit. In the event of an emergency, this cylinder bolt is unlocked via a manually actuatable switching valve so that the telescoping cylinder which is thus decoupled from the inner boxes can be retracted for the purpose of repair.

SUMMARY OF THE INVENTION

The present invention provides a vehicle crane having a telescoping jib with an improved securing and locking unit. In particular, the securing and bolting unit is to enable an emergency operation.

In accordance with an embodiment of the invention, in the case of a vehicle crane having a telescoping jib, comprising a basic box with retractable and extendible inner boxes and a securing and locking unit which comprises a first adjusting cylinder and a second adjusting cylinder which are each designed as unilaterally acting hydraulic cylinders with a first spring element and a second spring element as well as a first line and a second line, wherein the first adjusting cylinder moves locking bolts between operating states of unbolted and bolted and the second adjusting cylinder moves driving bolts between operating states of secured and released, an improvement in the securing and locking unit is achieved by virtue of the fact that, in the event of a malfunction, the operating state of bolted and the operating state of released are automatically established or, in the event of a malfunction, the first adjusting cylinder moves to the bolted operating state and the second adjusting cylinder moves to the released operating state. This inventive activation and configuration of the first and second adjusting cylinders ensures that, in the event of a malfunction, the adjusting cylinders always assume preselected safe operating states. In the context of the present invention, automatically means that the first and second adjusting cylinders each move to their preselected safe operating state without energy supply and without signal supply. In the present case, this means that the first and second adjusting cylinders move to the bolted and released operating states, respectively, without pressure or in a low pressure state. In the operating state ofbolted, the basic box or the inner boxes are always bolted to the next larger inner box. In the context of the present invention, a malfunction is understood to be at least one failure of the supply of energy, in particular hydraulic energy, to the first adjusting cylinder and/or the second adjusting cylinder. Faults in the hydraulic supply (e.g. defective hydraulic line), faults in the electrical activation of the valves (e.g. cable break), faults in the electromagnetic drive of the valves (e.g. burning out of a magnet) or mechanical blocking of a displacement of the valves (e.g. jamming of a valve body) are conceivable in this case, which occurs predominantly in a non-energized rest position. The fact that the two adjusting cylinders are in the operating states of bolted and released ensures in any event that the telescoping device can continue to be retracted and extended. Since the securing and locking unit with the first and second adjusting cylinders and in most cases the first and second valves is extended with the telescoping device, better accessibility is provided in the event of a malfunction by retracting the telescoping device. In the event of a malfunction, the first and second adjusting cylinders are then activated by means of a so-called emergency operation, insofar as this is necessary in the various embodiments proposed hereinafter.

In a particular embodiment, provision is made that, in the event of a malfunction, the first adjusting cylinder moves to the operating state of bolted via the first spring element and the second adjusting cylinder moves to the operating state of released via the second spring element.

In a particular structural embodiment the first spring element is allocated to a bottom end of the first adjusting cylinder, the second spring element is allocated to a bottom end of the second adjusting cylinder, the first line is connected only to a rod end of the first adjusting cylinder and the second line is connected only to a rod end of the second adjusting cylinder.

In a typical manner, a first valve arranged in the first line and a second valve arranged in the second line are provided in order to activate the first and second adjusting cylinders, said valves automatically moving to their inoperative position in the event of a malfunction and thereby the first adjusting cylinder moves into the bolted operating state and the second adjusting cylinder moves into the released operating state. In the context of the present invention, automatically means that the first and second valves each move to their preselected rest position without energy supply and/or signal supply. In the present case, this means that the first and second adjusting cylinders then move to the bolted and unreleased operating states, respectively. These movements of the first adjusting cylinder into the bolted operating state and of the second adjusting cylinder into the released operating state take place immediately without any further supply of signals or energy. In the inoperative position, the rod chamber of the adjusting cylinder is then typically connected to the low-pressure line.

In a particular alternative embodiment, provision is made that the first spring element has a higher force level than the second spring element, so that with a medium pressure applied to the second line, the second adjusting cylinder moves from the operating state of released to the operating state of secured, and with a high pressure applied to the first line, the first adjusting cylinder moves from the operating state of bolted to the operating state of unbolted. Therefore, the first and second adjusting cylinders can be selectively activated via a common line for the hydraulic oil by varying the pressure levels.

It proves to be particularly simple in structural terms that the first valve and the second adjusting cylinder are mechanically locked via a locking element in such a manner that the first valve is locked for movement to its inoperative position as long as the second adjusting cylinder is in the operating state of released.

In a typical manner, provision is made that the vehicle crane has a telescoping drive or device, the first line and the second line are connected to a common seventh line and the seventh line is guided through the telescoping device.

In an independently inventive manner, provision is made that the vehicle crane has a telescoping device, in which the first line and the second line are each separately guided through the telescoping device.

In a particularly advantageous manner, provision is made that the vehicle crane has a superstructure and the first and second valves are arranged in the superstructure. Since, as a result thereof, the first and second valves and thus the associated hydraulic block are no longer seated on the telescoping cylinder but instead are installed in the superstructure, the first and second valves can be easily maintained and repaired at this location at any time. Since the first and second adjusting cylinders are equipped with spring elements, two lines are sufficient as oil supplies—e.g. internal oil feed-through in the telescoping cylinder, energy chain, hose reel—to move the adjusting cylinders to all desired positions. If the spring elements in the adjusting cylinder are still also at different force levels, even one line is sufficient for the oil supply. As previously written, any desired position can then likewise be achieved via different pressure levels.

An exemplified embodiment of the invention will be explained in greater detail with reference to the following description.

DESCRIPTION OF THE PREFERRED EMBODIMENTS

Figure 1:
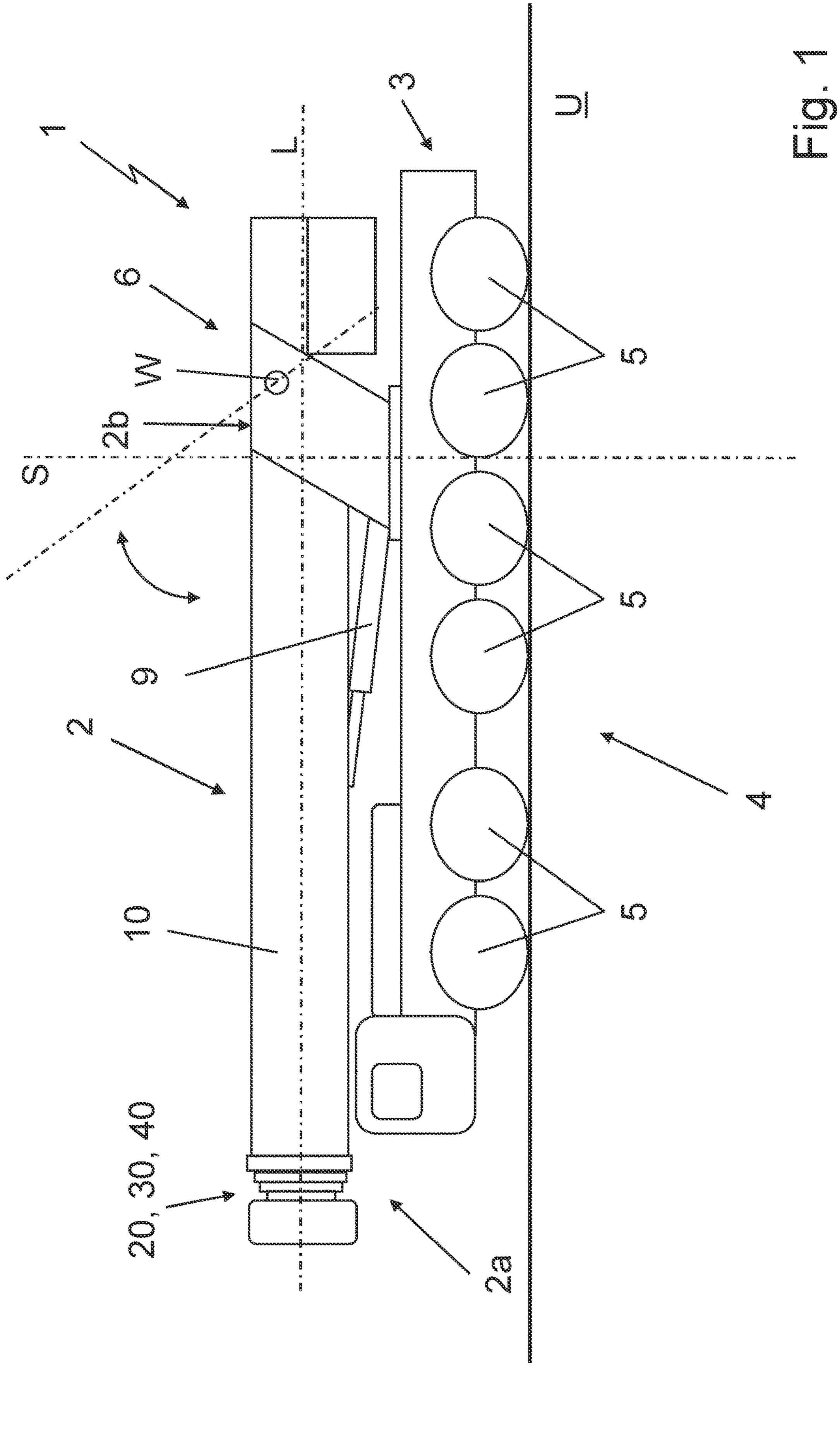
FIG. 1 shows a schematic view of a vehicle crane.

FIG. 1 shows a schematic view of a vehicle crane 1 that can travel on public roads, is parked on a horizontal ground U and has a telescoping jib 2 which, in a transport position, extends with its longitudinal direction L in parallel with a horizontal direction. The telescoping jib 2 with its head end 2*a* and a telescoping jib head and a foot end 2*b* is illustrated only schematically. The vehicle crane 1 has a lower carriage 3 which, in the example shown here, has a wheeled running gear unit 4 which comprises six axles in all having in each case at least two rubber-tired wheels 5 which are mounted to be rotatable on the axles and are spaced apart from one another. Arranged on the lower carriage 3 is a superstructure 6 which carries the telescoping jib 2 and can be pivoted relative to the lower carriage 3 about a pivot axis S extending in parallel with an upwards direction. The telescoping jib 2 is articulated on the superstructure 6 via its foot end 2*b* about a horizontal luffing axis W and with respect to a counterweight on the superstructure 6.

The telescoping jib 2 has a basic box 10 which is articulated in a luffable manner on the superstructure 6 and contains a plurality of inner boxes 20, 30, 40. Owing to their stepped, substantially rectangular cross-sections which are matched to each other, the first to third inner boxes 20, 30, 40 are arranged one inside the other and within the basic box 10 such that these can be displaced, in particular can be hydraulically retracted and extended, accordingly linearly in the longitudinal direction L of the telescoping jib 2. The telescoping jib 2 is accordingly luffable or can be erected almost vertically via at least one linear drive, acting between the basic box 10 and the superstructure 6, in the form of a luffing cylinder 9. At the free end of the telescoping jib 2 and thus at the telescoping jib head of the innermost third inner box 40, a load lifting or picking-up device is typically suspended via a lifting cable, not illustrated, in order to be able to lift and lower a load. The load lifting or picking-up device is preferably formed as a load hook having a lower block for a cable reeving.

Figure 2:
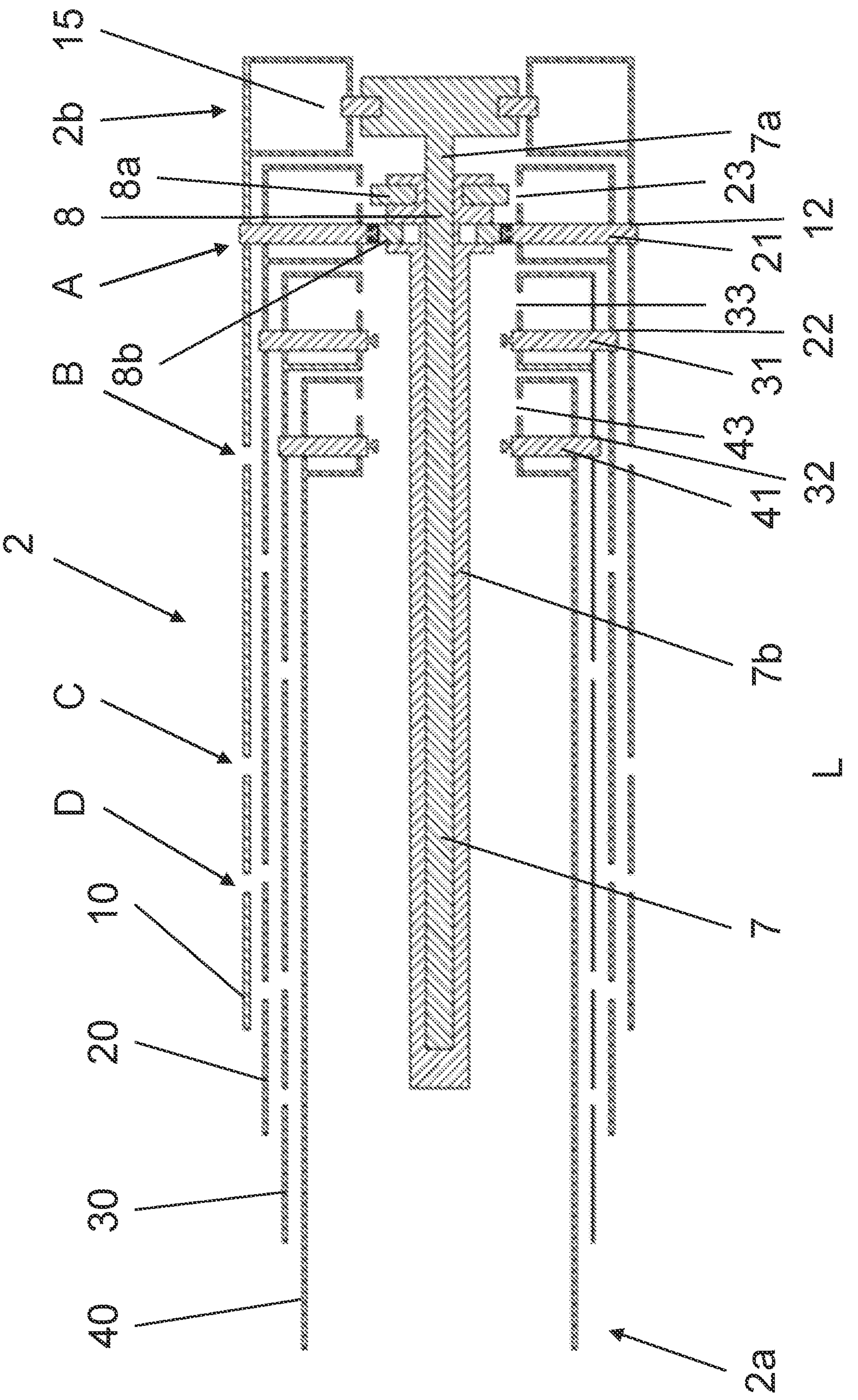
FIG. 2 shows a schematic plan view of a telescoping jib in section in a basic state.

FIG. 2 shows a schematic plan view of a telescoping jib 2 in section. With a horizontally oriented telescoping jib 2, the section plane is approximately halfway up the telescoping jib 2 and extends centrally through its left and right side walls. In a corresponding manner, the section also extends through bolting holes 12, 22, 32 which are typically arranged in the side walls of the basic box 10 and the first and second inner boxes 20, 30 and are arranged in each case along the basic box 10 and the inner boxes 20, 30 in a retraction position A, a first extension position B, a second extension position C and a third extension position D. No bolting holes are provided in the innermost third inner box 40, as the innermost third inner box 40 is bolted at the bolting holes 32 of the outwardly adjacent second inner box 30. Fundamentally, it is feasible for further bolting holes also to be arranged on the third inner box 40 in order to accommodate further inner boxes, not illustrated.

In the case of the telescoping jib 2, the retraction position A and the extension positions B, C and D are to be associated in each case with specific and equal extension lengths of the inner boxes 20, 30, 40, e.g. with the values of 0%, 45%, 90% and 100% extension length. Since, at the foot ends of the inner boxes 20, 30, 40, the locking bolts 21, 31, 41 protrude inwards, the next inner box 20, 30, 40 cannot be inserted completely in each case. The bolting holes 12, 22, 32 are provided with reference numerals only by way of example at the first extension position B and, of course, are also found at all other extension positions C, D and the retraction position A.

Furthermore, it can be seen in FIG. 2 that the first locking bolt 21 is arranged internally at the foot end 2*b* of the first inner box 20, the second locking bolt 31 is arranged internally at the foot end 2*b* of the second inner box 30 and the third locking bolt 41 is arranged internally at the foot end 2*b* of the third inner box 40. The basic box 10 and the inner boxes 20, 30, 40 are designed as tubular bodies with a substantially rectangular cross-section and the locking bolts 21, 31, 41 are each arranged laterally—in relation to the top side or bottom side of the basic box 10 or inner box 20, 30, 40—and internally on one of the two side walls of the basic box 10 or inner box 20, 30, 40. Also, the locking bolts 21, 31, 41 are each movable transversely to the longitudinal direction L of the telescoping jib 2 and horizontally—in relation to a telescoping jib 2 oriented horizontally in the longitudinal direction L—from a bolted position to an unbolted position by a so-called securing and locking unit 8. In the locking position, the respective locking bolts 21, 31, 41 connect the inner box 20, 30, 40, on which they are arranged, to the next outer inner box 20, 30 and basic box 10 respectively, in which they are moved into corresponding bolting holes 12, 22, 32. A retraction and extension movement in the longitudinal direction L of the respective inner boxes 20, 30, 40 is thus blocked by the respective locking bolt 21, 31, 41 in the bolted position. In the unbolted position, the locking bolts 21, 31, 41 release the bolting hole 12, 22, 32 of the next outer inner box 20, 30 or basic box 10.

Fundamentally, it is also feasible that the bolting holes 12, 22, 32 are arranged in the top side or bottom side of the basic box 10 or inner box 20, 30, 40.

Typically, in order to change the length of the telescoping jib 2, the inner boxes 20, 30, 40 are linearly retracted and extended individually and successively from the basic box 10 or the next outer inner box 20, 30 by means of a telescoping device or drive or drive device 7. The telescoping device 7 is typically designed as a hydraulic cylinder with a piston rod 7*a* and a cylinder housing 7*b* and is arranged centrally in the telescoping jib 2. The telescoping device 7 is supported with a free end of its piston rod 7*a* in the region of a foot connection 15 of the basic box 10. The telescoping device 7 also extends with its longitudinal extension in the longitudinal direction L of the telescoping jib 2. The securing and locking unit 8 is arranged on the thus extendible cylinder housing 7*b* of the telescoping device 7, in particular at its lower end of the cylinder housing 7*b* close to the piston rod 7*a*. On the one hand, by means of the securing and locking unit 8 the telescoping device 7 can be secured by means of driving bolts 8*a* for retracting and extending the respective inner box 20, 30, 40 with first, second or third apertures 23, 33, 43 arranged at that location in the region of the respective foot ends 2*b* by retracting the driving bolts 8*a* into the aperture 23, 33, 43, and can be released by extending the driving bolts 8*a* out of the aperture 23, 33, 43. In relation to the driving bolts 8*a*, the operating states of "secured" and "released" are thus available. On the other hand, the securing and locking unit 8 also has the task of detaching the inner box 20, 30, 40, which is to be retracted or extended in each case, from the next outer inner box 20, 30 or basic box 10 by moving locking bolts 21, 31, 41 in each case from a bolted position to an unbolted position in each case before the retraction or extension movement of the securing and locking unit 8, or of connecting said inner box to the next outer inner box 20, 30 or basic box 10 after the retraction or extension movement of the securing and locking unit by moving the respective locking bolt 21, 31, 41 from its unbolted position to its bolted position. By means of the locking bolts 21, 31, 41 inserted into or pulled out of the respective bolting holes 12, 22, 32, adjacent basic boxes 10 and inner boxes 20, 30, 40 can typically be connected to and detached from one another in the retraction position A, the first extension position B, the second extension position C and the third extension position D. For each locking bolt 21, 31, 41 on the inner box 20, 30, 40, the associated bolting hole 12, 22, 32 is located in each case in the next outer basic box 10 or inner box 20, 30. For this purpose, the locking bolts 21, 31, 41 are each arranged in a positionally fixed manner and internally at the foot ends of the inner boxes 20, 30, 40 and are each urged to the bolted position into the respective bolting hole 12, 22, 32 via a spring force. It is also conceivable that the locking bolts 21, 31, 41 are urged into the respective bolting hole 12, 22, 32 via a latching mechanism, such as e.g. ball latching bolts. In order to actuate the locking bolts 21, 31, 41, actuating elements 8*b* are arranged on the securing and locking unit 8 and are used to grasp the inwardly protruding ends of the locking bolts 21, 31, 41 and to pull same inwards out of the respective bolting hole 12, 22, 32. In relation to the locking bolts 21, 31, 41, the operating states of "bolted" and "unbolted" are thus available.

Also, in addition to the previously described driving bolts 8*a* and actuating elements 8*b*, the securing and locking unit 8 also has a first adjusting cylinder 51 and a second adjusting cylinder 52 which are described in greater detail hereinafter in relation to FIGS. 7*a* to 7*c*. By means of the hydraulically driven first and second adjusting cylinders 51, 52, the driving bolts 8*a* and the actuating elements 8*b* are moved between the respective operating states of "secured" and "released" or the respective operating states of "bolted" and "unbolted". Arranged between the first and second adjusting cylinders 51, 52 and the driving bolts 8*a* and the actuating elements 8*b*, is a transmission mechanism, not described in greater detail, which is preferably a connecting link typically used for this purpose and having corresponding guide paths and drivers. On the one hand, the linear movement of the first and second adjusting cylinders 51, 52 is transmitted to the driving bolts 8*a* and the actuating elements 8*b* via the transmission mechanism and, on the other hand, a mechanical lock can also be provided so that the operating state of "unbolted" is possible only if the operating state of "secured" is provided.

Normally, the driving bolts 8*a* and actuating elements 8*b* lie one above the other in the same plane in relation to the longitudinal direction L of the telescoping jib 2. In FIG. 2, they have been illustrated one behind the other in the longitudinal direction L of the telescoping jib 2 in order to provide better clarity. Moreover, the foregoing description has been provided with reference to only one side of the telescoping jib 2 and thus in each case to only one driving bolt 8*a*, one actuating element 8*b*, one bolting hole 12, 22, 32 and one associated aperture 23, 33, 43. However, it can be seen in FIG. 2 that in each case a driving bolt 8*a*, an actuating element 8*b*, a bolting hole 12, 22, 32 and an associated aperture 23, 33, 43 are each arranged opposite one another in relation to the longitudinal direction L of the telescoping jib 2.

FIG. 2 shows the telescoping jib 2 and the associated basic and inner boxes 10, 20, 30, 40 in the completely retracted basic state, as also shown in FIG. 1. In this basic state, the inner boxes 20, 30, 40 are each in the operating state of "bolted" and the driving bolt 8*a* is in the operating state of "released", i.e. the completely retracted telescoping device 7 is detached from the inner boxes 20, 30, 40.

Figure 3:
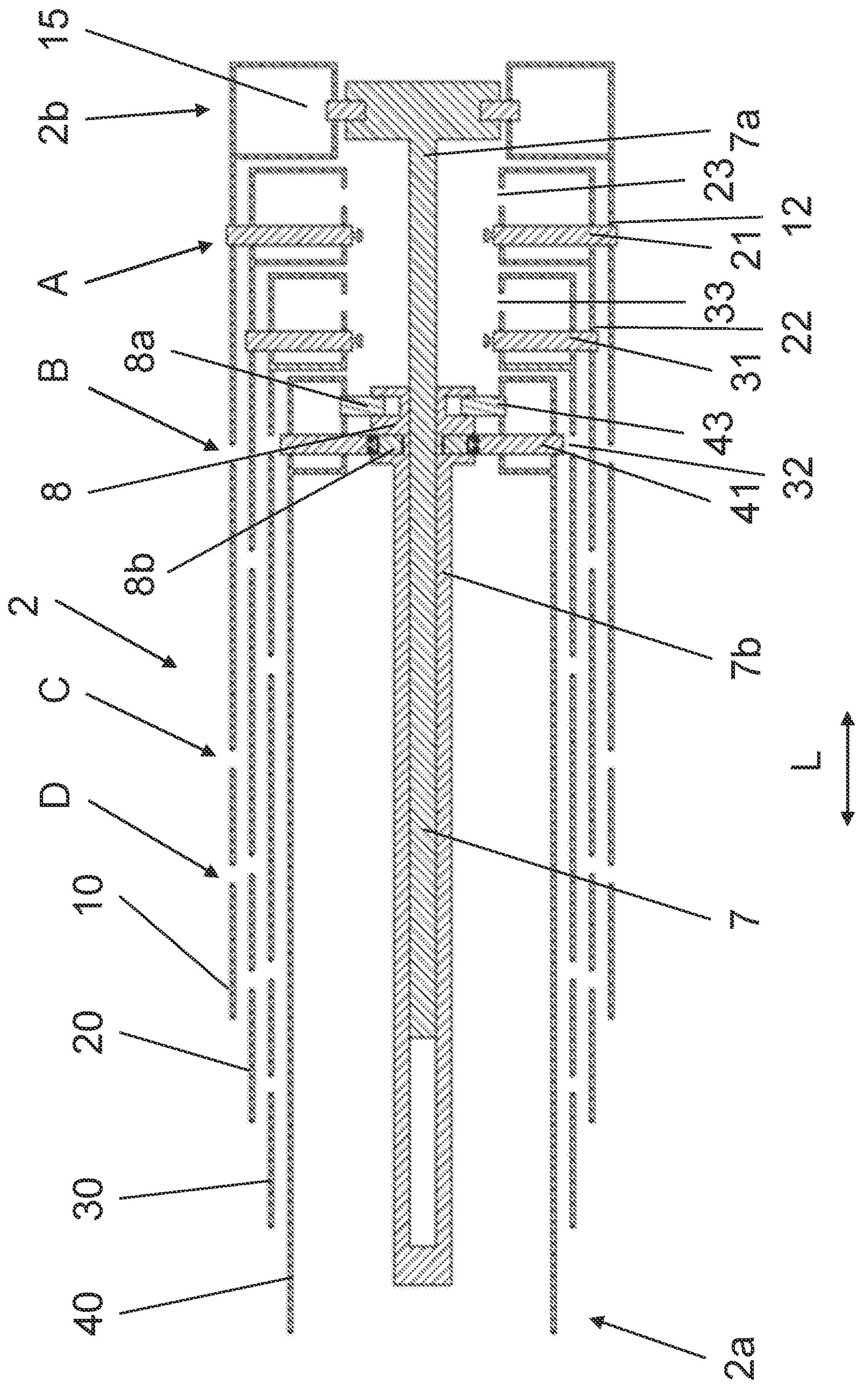
FIG. 3 shows a schematic plan view according to FIG. 2 in a first extension state.

FIG. 3 shows the schematic plan view according to FIG. 2, wherein, compared to FIG. 2, the telescoping jib 2 is located in a first extension state in relation to a planned extension of the third inner box 40. The telescoping device 7 is slightly extended so that the securing and locking unit 8, as seen in the longitudinal direction L of the telescoping jib 2, is at the height of the aperture 43 in the innermost third inner box 40 and at the height of the third locking bolt 41. After the telescoping device 7 has been moved, the two driving bolts 8*a* have then been moved in opposite directions from the operating state of "released" to the operating state of "secured". As a result, the driving bolts 8*a* are now in engagement with the third apertures 43 in the third inner box 40. Then, the third inner box 40 can be detached from the second inner box 30 by pulling the third locking bolts 43 out of the bolting holes 32 in the second inner box 30 from the operating state of "bolted" to the operating state of "unbolted". The third inner box 40 is now ready to be extended.

Figure 4:
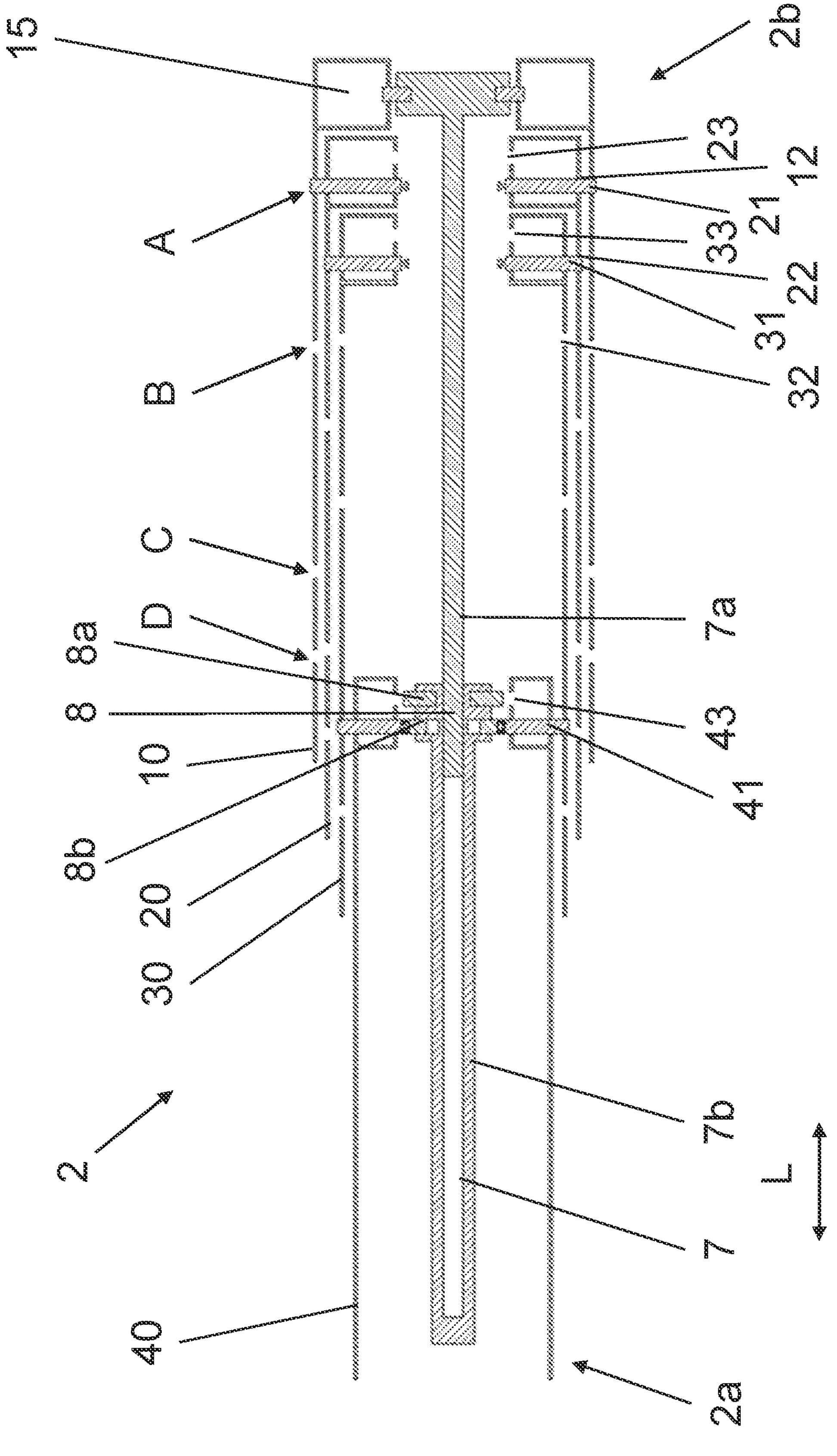
FIG. 4 shows a schematic plan view according to FIG. 2 in a second extension state.

FIG. 4 shows a further schematic plan view according to FIG. 2, wherein, compared to FIG. 3, the telescoping jib 2 is located in a second extension state. The telescoping device 7 together with the third inner box 40 has now been extended to such an extent that the third inner box 40 has been extended from the retraction position A shown in FIG. 3 to the second extension position C on the second inner box 30. In the extension position C, the locking bolts 41 on the third inner box 40 are located, as seen in the longitudinal direction L of the telescoping jib 2, at the height of the bolting holes 32 in the second inner box 30. During and after the movement of the telescoping device 7, the two driving bolts 8*a* continue to be in the operating state of "secured". In a first step, the locking bolts 43 are then moved from the operating state of "unbolted" to the operating state of "bolted" only by release of the actuating elements 8*b* and therefore the locking bolts 43 are located in the bolting holes 32 in the second inner box 30, as illustrated in FIG. 4. Only then are the driving bolts 8*a* moved from the operating state of "secured" to the operating state of "released". Therefore, the telescoping device is detached from the third inner box.

In a next step, the telescoping device 7 can then be retracted in order to arrive at the retracted basic position shown in FIG. 2. Now, the extension previously described in connection with the third inner box 40 can be repeated in relation to the first inner box 20 and the second inner box 30. In this case, any extension positions can be selected from the possible extension positions B, C, D. This is repeated until the desired extension sequence of the inner boxes 20, 30, 40 is achieved. At the end, the telescoping cylinder 7 is then retracted or can remain in the respective extension position if required. In this case, it is necessary to take into consideration that the procedure is always started with the smallest of the inner boxes 20, 30, 40 which is to be moved. The retraction or inwards telescoping is then effected in reverse order in the same way. In this case, it is necessary to start with the largest of the inner boxes 20, 30, 40 which is to be moved.

Figure 5:
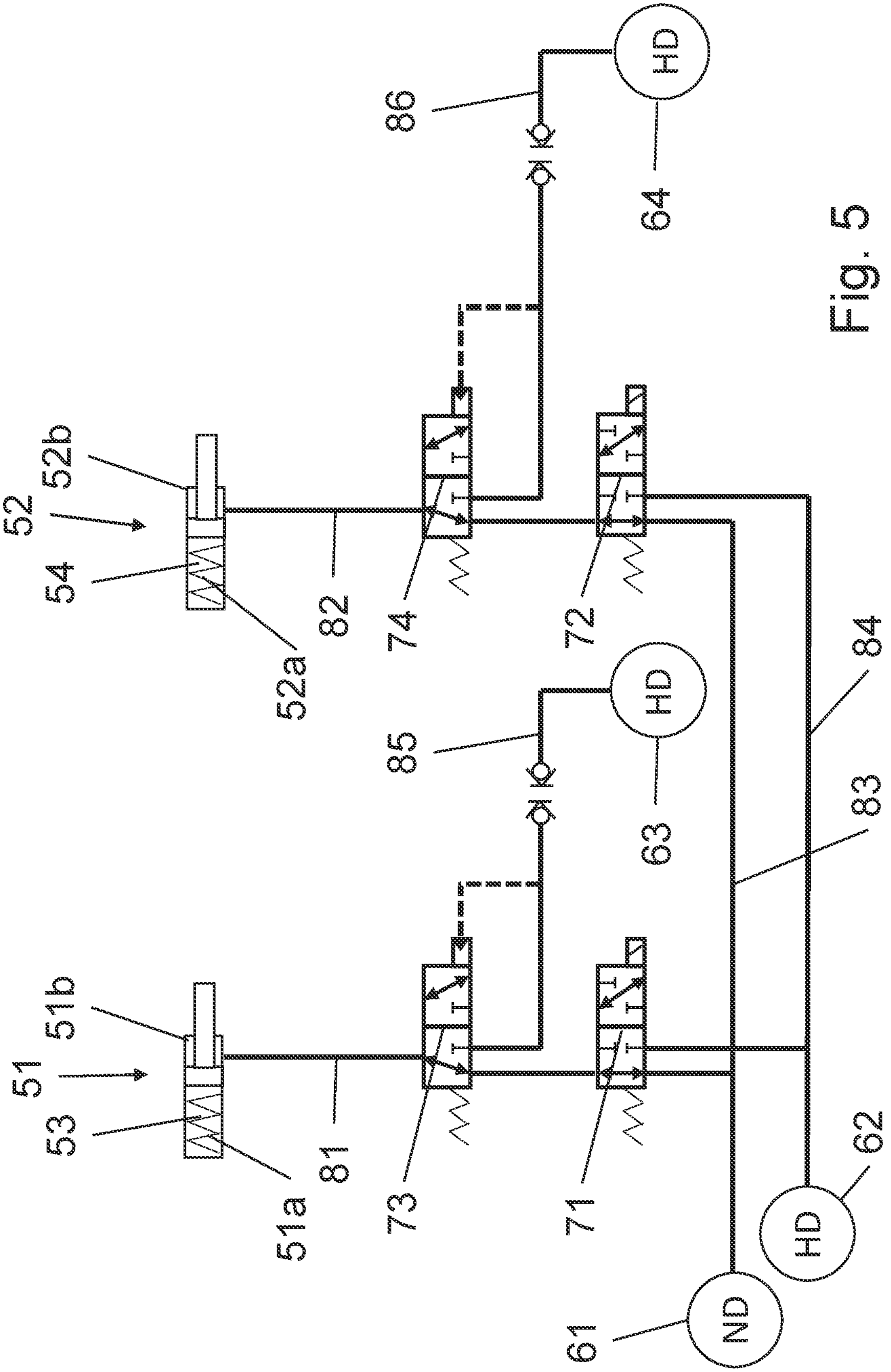
FIG. 5 shows a schematic hydraulic plan relating to an operating state according to a first embodiment.

FIG. 5 shows a schematic hydraulic plan according to a first embodiment, wherein the first adjusting cylinder 51 is located in the operating state of "bolted" and the second adjusting cylinder 52 is located in the operating state of "released". Each of the two hydraulic adjusting cylinders 51, 52 is operated with hydraulic oil, typically has a bottom end 51*a*, 52*a* and a rod end 51*b*, 52*b* and is designed as a unilaterally acting hydraulic cylinder. In a corresponding manner, a first spring element 53 is installed in a housing of the first adjusting cylinder 51 on its bottom end 51*a* and a second spring element 54 is installed in a housing of the second adjusting cylinder 52 on the bottom end 52*a*. The spring elements 53, 54 have almost the same force level, so that an adjustment of the spring elements 53, 54 can be effected via a comparable pressure. A first line 81 is connected to the rod end 51*b* of the first adjusting cylinder 51 and a second line 82 is connected to the rod end 52*b* of the second adjusting cylinder 52. The first adjusting cylinder 51 or the second adjusting cylinder 52 moves to its spring-loaded and extended inoperative position via the spring elements 53, 54 in the zero-pressure state or with low pressure ND in the hydraulic lines 81, 82. In this case, the pressure applied to the piston of the adjusting cylinder 51, 52 is less than the arithmetic pressure of the spring element 53, 54 in the extended state. The first adjusting cylinder 51 which is extended at zero pressure is to be allocated to the operating state of "bolted" of the associated actuating element 8*b* or the locking bolt 21, 31, 41. In contrast, the second adjusting cylinder 52 which is extended at zero pressure is to be allocated to the operating state of "released" of the associated driving bolt 8*a*. In the present case, the low pressure ND is below 40 bar and the high pressure HD is between 60 and 120 bar. The force levels of the first and second spring elements 53, 54 are then 4000+/−2000 N. A distance of 20 bar between the low pressure ND and the high pressure HD has been selected in order to obtain clear switching states of the adjusting cylinders 51, 52 by means of a corresponding pressure specification. It is obvious to a person skilled in the art to find suitable values for low pressure ND, high pressure HD and spring force in a suitable respective ratio to each other in order to be able to reliably switch and to achieve the desired movement of the adjusting cylinders 51, 52 between their respective operating states. It is obvious that, depending upon the configuration of the vehicle crane and its hydraulic system, the values for low pressure ND, high pressure HD and spring force can therefore also deviate from the aforementioned exemplified value ranges.

Fundamentally, it is also feasible that in the first and second adjusting cylinders 51, 52 the respective spring element 53, 54 is not allocated to the bottom end 51*a*, 52*a* but instead to the rod end 51*b*, 52*b*. In a corresponding manner, the lines 81, 82 would then not be allocated to the rod end 51*b*, 52*b* but instead to the bottom end 51*a*, 52*a*. In order, in accordance with the invention, to then achieve the operating states of "bolted" and "released" in a zero-pressure or currentless state, the first and second adjusting cylinders 51, 52 would then have to be connected to the driving bolts 8*a* and the actuating elements 8*b* via suitable connecting links or deflecting elements. This statement applies to all of the embodiments described herein.

Moreover, FIG. 5 schematically shows a first pressure source 61 at a low pressure ND and a second pressure source 62 at a high pressure HD, each of which can be e.g. an intermediate hydraulic accumulator which can be supplied with hydraulic energy from the telescoping device 7 via an open or closed hydraulic circuit of the vehicle crane 1 or on the rod end or bottom end. The first pressure source 61 is connected via a third line 83 at low pressure ND to a first valve 71 for the first adjusting cylinder 51 and in parallel is connected to a second valve 72 for the second adjusting cylinder 52. In a corresponding manner, the second pressure source 62 is also connected via a fourth line 84 at high pressure HD to the first valve 71 for the first adjusting cylinder 51 and in parallel is connected to the second valve 72 for the second adjusting cylinder 52. The first and second valves 71, 72 are each designed as electromagnetically actuatable two-way valves, of which the so-called working connection is currentless and thus connected to the third hydraulic line 83 at low pressure ND when the first and second valves 71, 72 are in the inoperative position. Therefore, in a currentless state, such as e.g. in event of a malfunction, the valves 71, 72 move to their inoperative position and connect the first pressure source 61 at low pressure ND to the first and second adjusting cylinders 51, 52. In an actuated or energised state, the valves 71, 72 connect the fourth hydraulic line 84 at high pressure HD to the first and second adjusting cylinders 51, 52 respectively. Thus, during a normal operation, the first and second adjusting cylinders 51, 52 can be moved via the valves 71, 72 to the desired operating states in the desired sequence.

In order to move the adjusting cylinders 51, 52 in an emergency operation from the operating states of "bolted" and "released", which are automatically established in a zero-pressure or currentless state, to the operating states of "unbolted" and "secured" in a selected sequence for retracting the telescoping cylinder 2, a third valve 73 and a fourth valve 74 are arranged in the first line 81 and the second line 82 respectively between the first adjusting cylinder 51 and the second adjusting cylinder 52 and the first valve 71 and the second valve 72 respectively. These third and fourth valves 73, 74 are also each designed as two-way valves which, however, can be hydraulically actuated and are at zero pressure in the inoperative position and connect their working connection to the third line 83 at low pressure ND. In the zero-pressure state, the third valve 73 connects the first adjusting cylinder 51 to the first pressure source 61 via the first valve 71, and the fourth valve 74 connects the second adjusting cylinder 52 to the second pressure source 62 via the second valve 72. This position is assumed by the third and fourth valves 73, 74 during a normal operation.

For the emergency operation, a fifth line 85 at high pressure HD and a sixth line 86 at high pressure HD are each coupled to the third valve 73 and the fourth valve 74 on the one hand at an input of the respective third and fourth valves 73, 74 and on the other hand at a hydraulic control input of the third and fourth valves 73, 74. By applying high pressure HD to the fifth hydraulic line 85 and the sixth hydraulic line 86 respectively, the respective third and fourth valves 73, 74 are thus moved in a first step from an inoperative position to their operative position, whereby the fifth line 85 is then connected to the first adjusting cylinder 51 and the sixth line 86 is connected to the second adjusting cylinder 52. During the emergency operation, the first and second adjusting cylinders 51, 52 can thus be moved to the desired operating states by selectively applying pressure to the fifth and sixth lines 85, 86 respectively in the desired sequence. The third and fourth valves 73, 74 also have the task of disconnecting the first and second adjusting cylinders 51, 52 from the normal supply via the third and fourth lines 83, 84 for the emergency operation.

It is also feasible to connect the fifth and sixth lines 85, 86 in each case only to the third and fourth valves 73, 74 at their hydraulic control inputs and to provide in each case additional lines, not illustrated, at high pressure HD, which are coupled to the first and second lines 81, 82 between the first and second adjusting cylinders 51, 52 and the third and fourth valves 73, 74 in order to then move the adjusting cylinders 51, 52 in the desired manner by means of pressurisation after the first and second lines 81, 82 are disconnected from the third and fourth lines 83, 84 of normal operation via the third and fourth valves 73, 74.

All valves 71, 72, 73, 74 are arranged in the telescoping jib 2. Also, corresponding intermediate hydraulic accumulators for the first and second pressure sources 61, 62 are located in the telescoping jib 2 and the coupling point for the fifth and sixth lines 85, 86 are located on the telescoping jib 2.

Figure 6:
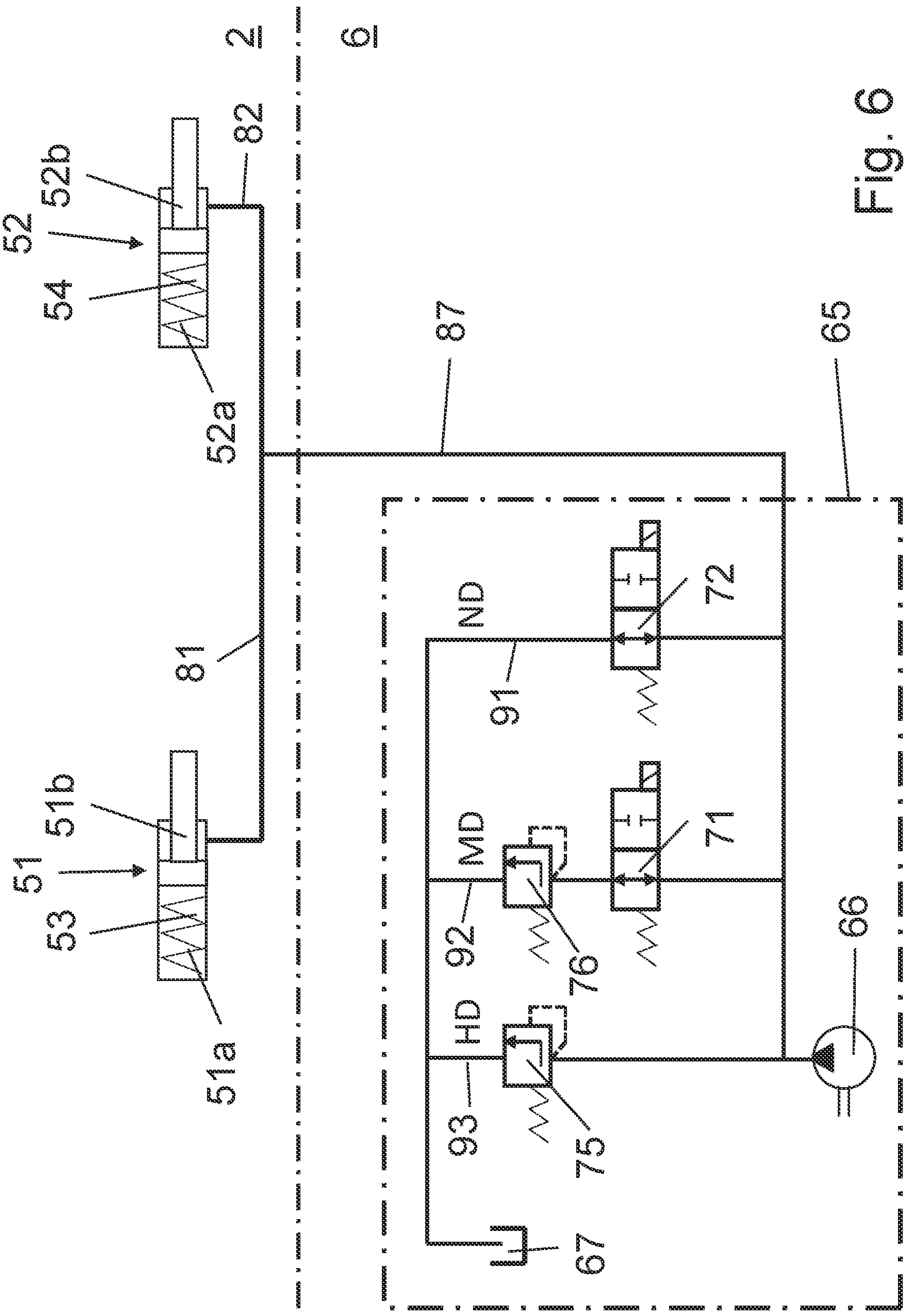
FIG. 6 shows a schematic hydraulic plan relating to an operating state according to a second embodiment.

FIG. 6 shows a schematic hydraulic plan relating to an operating state of the first and second adjusting cylinders 51, 52 according to a second embodiment, wherein the first and second adjusting cylinders 51, 52 are designed as described in detail above in relation to FIG. 5 and the first adjusting cylinder 51 is in the operating state of "bolted" and the second adjusting cylinder 52 is in the operating state of "released". It is also the case here that, in a low-pressure state or a zero-pressure state which also occurs in the event of a malfunction, the operating states of "bolted" and "released" of the first and second adjusting cylinders 51, 52 are always automatically established in an inventive manner.

As a substantial difference to the first embodiment according to FIG. 5, the spring elements 53, 54 of the first and second adjusting cylinders 51, 52 have different force levels, i.e. the first spring element 53 is harder than the second spring element 54. Therefore, the two adjusting cylinders 51, 52 can be supplied with hydraulic oil via a first line 81 and a second line 82, respectively, which then issue into a common seventh line 87. The seventh line 87 is connected to a fifth pressure source 65 which can variably supply the seventh hydraulic line 87 with a low pressure ND, a medium pressure MD and a high pressure HD for the purpose of switching the two adjusting cylinders 51, 52. In the interaction of the pressure states in the seventh line 87 and the mutually different force levels of the first spring element 53 and the second spring element 54, the operating states of "unbolted" and "secured" of the two adjusting cylinders 51, 52 are set in the seventh line 87 in a high-pressure state HD and the operating states of "bolted" and "secured" are set in the seventh line 87 in the medium-pressure state MD. In this embodiment, by applying a medium pressure MD to the seventh line 87, it can be achieved that the second adjusting cylinder 52 retracts and the first adjusting cylinder 51 does not retract.

All operating states of the two adjusting cylinders 51, 52 can be achieved in this second embodiment with only a single seventh line 87 by the different force levels of the spring elements 53, 54.

In the present case, the low pressure ND is below 10 bar, the medium pressure MD is between 20 and 60 bar and the high pressure HD is between 80 and 120 bar. The force level of the first spring element 53 is then 7000 N+/−2000 N and of the second spring element 54 is 3000 N+/−1000 N. An interval of 10 bar or 20 bar between the low pressure ND and the medium pressure MD as well as the medium pressure MD and the high pressure HD has been selected in order to obtain clear switching states of the adjusting cylinders 51, 52 only via a pressure specification in the seventh line 87. It is obvious to a person skilled in the art to find suitable values for low pressure ND, medium pressure MD, high pressure HD and the two spring forces in a suitable respective ratio to each other in order to be able to reliably switch and achieve the desired movement of the adjusting cylinders 51, 52 between their respective operating states. It is obvious that, depending upon the configuration of the vehicle crane and its hydraulic system, the values for low pressure ND, medium pressure MD, high pressure HD and the spring forces can thus also deviate from the aforementioned exemplary value ranges.

The fifth pressure source 65 has been described above as variable in order to supply the seventh line 87 with a low pressure ND, a medium pressure MD or a high pressure HD for the purpose of switching the two adjusting cylinders 51, 52. This variable pressure source 65 can be designed e.g. as an open hydraulic circuit having a hydraulic pump 66 with a constant flow rate, first and second valves 71, 72, first and second pressure limiting valves 75, 76 and a tank 67 for the hydraulic oil return. The hydraulic pump 66 is connected on the output side to the seventh line 87. Within the fifth pressure source 65, the seventh line 87 for providing the high pressure HD is connected to the hydraulic pump 66 and, in parallel, to the first pressure limiting valve 75 which is connected to the tank 67 via a third return line 93. By means of the first pressure limiting valve 75, the high pressure HD in the seventh line 87 is set in interaction with the hydraulic pump 66. Furthermore, the seventh line 87 for providing the medium pressure MD is connected, in parallel, to the first valve 71 which is connected on the output side to the second pressure limiting valve 76 and is connected to the tank 67 via a second return line 92. Furthermore, the seventh line 87 for providing the low pressure ND is connected again, in parallel, to the second valve 72 which is connected on the output side to the tank 67 via a first return line 91.

The low-pressure state ND or a zero-pressure state is also established in this case in an inventive manner if the current supply or pressure supply fails, as occurs e.g. in the event of a malfunction, and in this case the first and second valves 71, 72 move to their inoperative position and as a result the operating states of "bolted" and "released" are automatically established for the first and second adjusting cylinders 51, 52. In this case, the seventh pressure line 87 is then connected to the tank 67 via the second valve 72 and via the first hydraulic return line 91.

During normal operation, switching the first and second valves 71, 72 to their inoperative position sets a low pressure ND in the seventh line, thus causing the first and second adjusting cylinders 51, 52 to move to the operating states of "bolted" and "released". The hydraulic oil then runs via the first return line 91 into the tank 67. In order to actuate the second adjusting cylinder 52 from its operating state of "released" to the operating state of "secured", the second valve 72 is closed and a medium pressure MD is established in the seventh line 87 via the connection of the seventh line 87 via the first valve 71 and the second pressure limiting valve 76 as well as the second hydraulic return line 92 to the tank 67. The correspondingly set second pressure limiting valve 76 and the force level of the second spring element 54, which is adjusted to the medium pressure MD, are substantially responsible for this. If the first valve 71 is now also closed, the first pressure limiting valve 75 determines the pressure in the seventh line 87, which is then at high pressure HD. As a result, the first adjusting cylinder 51 is then moved from the operating state of "bolted" to the operating state of "unbolted".

Alternatively, the fifth pressure source 65 can be equipped with an adjustable hydraulic pump 66 with an internal pressure regulator. Accordingly, the valves 71, 72 and the pressure limiting valves 75, 76 can then be omitted.

For the emergency operation, the seventh pressure line 87 can then be supplied with low pressure ND, medium pressure MD or high pressure HD via an alternative pressure source for the purpose of switching the first and second adjusting cylinders 51, 52.

All valves 71, 72 and pressure limiting valves 75, 76 are arranged in the superstructure 6. Only the two adjusting cylinders 51, 52 and the associated seventh pressure line 87 are located in the telescoping jib 2. In this case, the seventh line 87 extends between the superstructure 6 and the securing and locking unit 8 at least partially through an oil feed-through in the piston rod 7*a* of the telescoping device 7. In terms of location, this allows easy access to the valves 71, 72 and pressure limiting valves 75, 76 in the event of a malfunction. Therefore, an emergency operation is not actually necessary because the valves 71, 72 and the pressure limiting valves 75, 76 are easily accessible in the event of a malfunction in the superstructure 6.

Figure 7C:
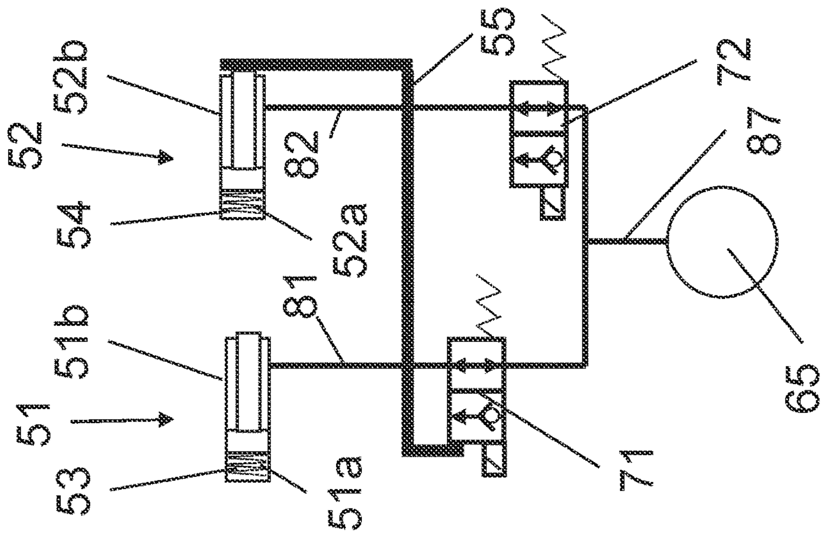
FIGS. 7*a* to 7*c* show schematic hydraulic plans relating to various operating states according to a third embodiment.
Figure 7B:
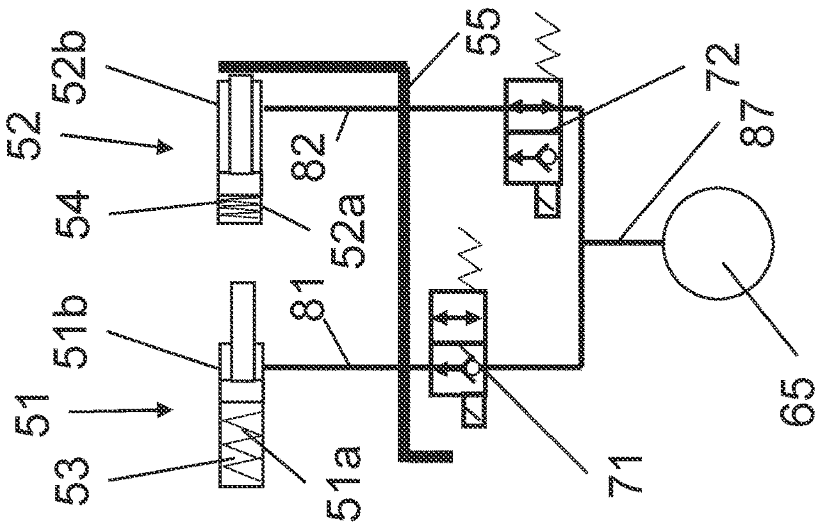
Figure 7A:
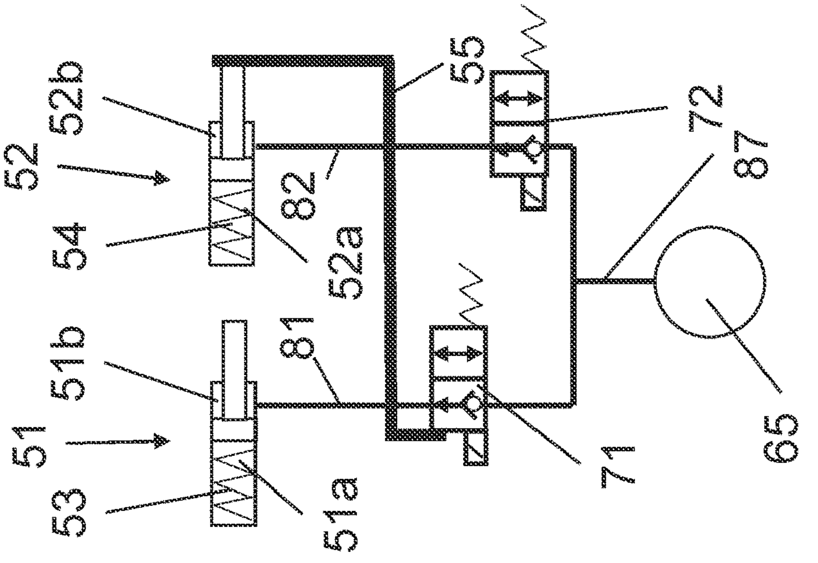

FIGS. 7*a* to 7*c* each show a schematic hydraulic plan according to a third embodiment, wherein the first and second adjusting cylinders 51, 52 are each in different operating states and are designed as described above in relation to FIG. 5. The spring elements 53, 54 have almost the same force level, so that an adjustment of the spring elements 53, 54 can be effected via a comparable pressure. FIG. 7*a* schematically shows a fifth pressure source 65 which can be e.g. an intermediate hydraulic accumulator which can be supplied with hydraulic energy via an open or closed hydraulic circuit of the vehicle crane 1 or from the telescoping device 7 on the rod end or bottom end. This variable fifth pressure source 65 provides, in addition to a low pressure ND, a single further preselected pressure level in the form of a high pressure HD. In relation to values of pressures and spring forces, reference is made to the description of FIG. 5. The aforementioned fifth pressure source 65 can be designed in the manner described above in relation to FIG. 6 and a seventh line 87 is connected via a first valve 71 and a first line 81 to the first adjusting cylinder 51 and via a second valve 72 and a second line 82 to the second adjusting cylinder 52. The first and second valves 71, 72 are each designed as electromagnetically actuatable two-way valves which are open when currentless and, in the energised state, have a non-return valve which blocks in the direction of the adjusting cylinder 51, 52 but allows a built-up pressure in the first and second adjusting cylinders 51, 52 to be reduced in the direction of the fifth pressure source 65. Therefore, in a currentless state, such as e.g. in event of a malfunction, the valves 71, 72 move to their inoperative position and connect the fifth pressure source 65 to the first and second adjusting cylinders 51, 52. As a result, in a low-pressure state ND or a zero-pressure state which also occurs in the event of a malfunction, the operating states of "bolted" and "released" in relation to the first and second adjusting cylinders 51, 52 are always automatically established in an inventive manner.

In FIG. 7*b*, the first adjusting cylinder 51 continues to be in the operating state of "bolting" and the second adjusting cylinder 52 is in the operating state of "secured".

This switching state can be achieved with the single seventh line 87 by virtue of the fact that the first valve 71 is mechanically locked in its inoperative position by a lock or locking element or member or structure 55 when a second adjusting cylinder 52 is in its operating state of "released", i.e. the first valve 71 can be moved to its operating position only when the second adjusting cylinder 52 has moved to its operating state of "secured" against the force of the second spring element 54. Only then does the locking element 55 enable a movement of the first valve 71 to its operating position. By energisation of the second valve 72 and corresponding movement of the second valve to its operating position, the second adjusting cylinder 52 is now retracted. This results in the operating states of "bolted" and "secured" for the first and second adjusting cylinders 51, 52.

If the first valve 71 is now moved from its inoperative position to its operating position after the mechanical interlock has previously been released by the locking element 55, the first adjusting cylinder 51 can now also be supplied with high pressure HD and thus moved in its operating state of "unbolted". The same is illustrated in FIG. 7*c*.

Also, in this case an emergency operation is not necessary, since in the currentless or zero-pressure operating state, the operating states of "bolted" and "released" are automatically established in accordance with the invention and regulated, and successive switching of the first and second adjusting cylinders 51, 52 can be effected solely by supplying the seventh line 87 with hydraulic oil at high pressure HD or alternatively via a replacement source. The operating states of "secured" and "bolted" shown in FIG. 7*b* will only be established for a short time period, since the first valve 71 will immediately move automatically to its inoperative position after being enabled by the locking element 55 and therefore will also supply the seventh line 87 with high pressure HD with the first adjusting cylinder 51 and therefore the operating state of "unbolted" is achieved.

The mechanical locking element 55 can be part of a transmission mechanism present between the first and second adjusting cylinders 51, 52 and the driving bolts 8*a* and the actuating elements 8*b*, said transmission mechanism preferably being a connecting link typically used for this purpose and having corresponding guide paths and drivers, or being constructed in parallel therewith according to a comparable mechanical principle.

Figure 8:
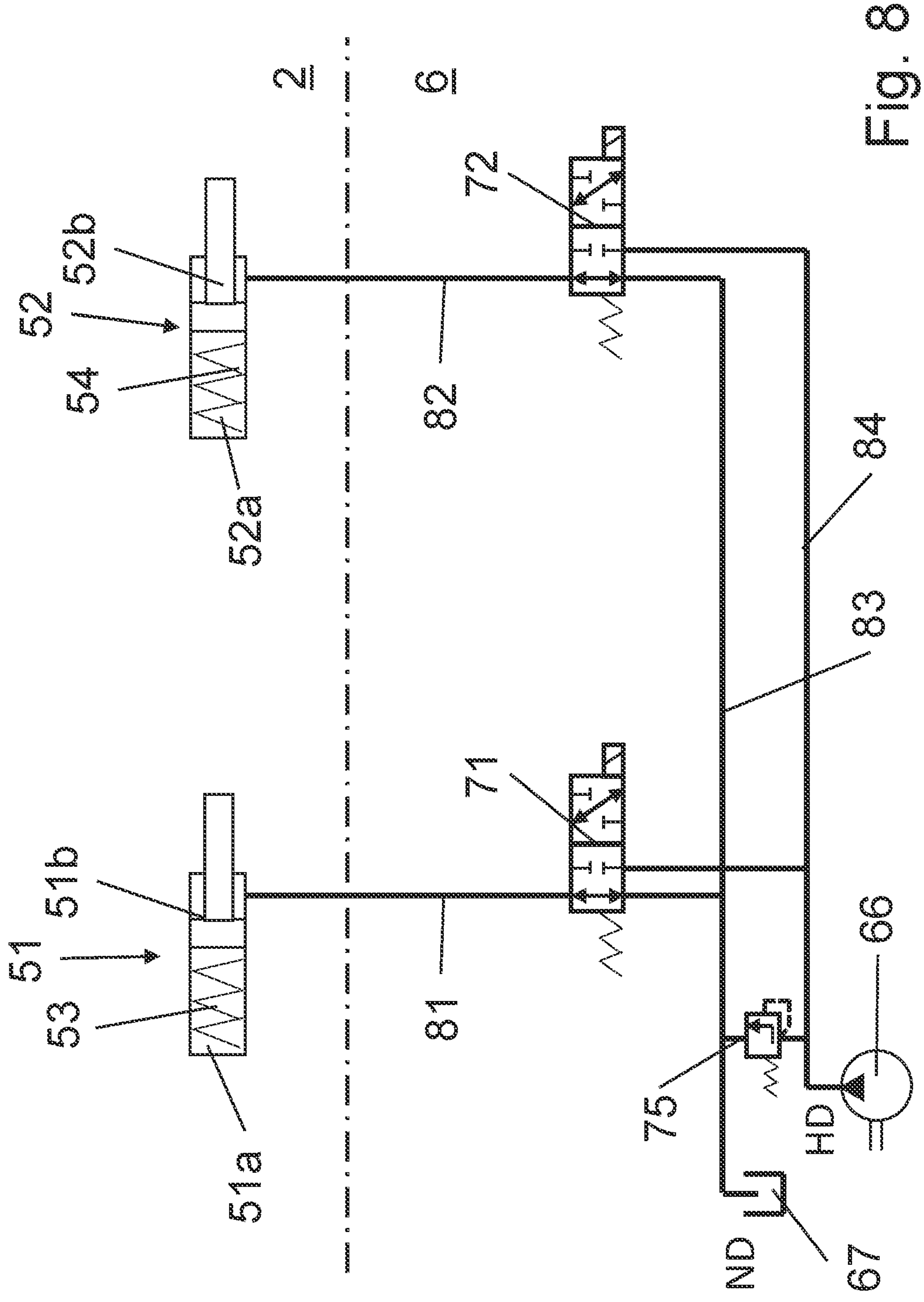
FIG. 8 shows a schematic hydraulic plan relating to an operating state according to a fourth embodiment.

FIG. 8 shows a schematic hydraulic plan according to a fourth embodiment, wherein the first and second adjusting cylinders 51, 52 are designed as described in detail above in relation to FIG. 5 and the first adjusting cylinder 51 is in the operating state of "bolted" and the second adjusting cylinder 52 is in the operating state of "released". It is also the case here that, in a low-pressure state ND or a zero-pressure state which also occurs in the event of a malfunction, the operating states of "bolted" and "released" of the first and second adjusting cylinders 51, 52 are always automatically established in an inventive manner. The spring elements 53, 54 have almost the same force level, so that an adjustment of the spring elements 53, 54 can be effected via a comparable pressure.

A first line 81 is connected to the rod end 51*b* of the first adjusting cylinder 51 and a second line 82 is connected to the rod end 52*b* of the second adjusting cylinder 52. The first adjusting cylinder 51 or the second adjusting cylinder 52 moves to its spring-loaded and extended inoperative position via the spring elements 53, 54 in the zero-pressure state or at low pressure ND in the lines 81, 82. In this case, the pressure applied to the piston of the adjusting cylinder 51, 52 is less than the arithmetic pressure of the spring element 53, 54 in the extended state. The first adjusting cylinder 51 which is extended at zero pressure is to be allocated to the operating state of "bolted". In contrast, the second adjusting cylinder 52 which is extended at zero pressure is to be allocated to the operating state of "released". In relation to values of pressures and spring forces, reference is made to the description of FIG. 5.

Moreover, FIG. 8 schematically shows a first pressure source 61 for a low pressure ND in the form of a return to a tank 67 and a second pressure source 62 in the form of a hydraulic pump 66 with a high pressure HD. The tank 67 is connected via a third line 83 at low pressure ND to a first valve 71 for the first adjusting cylinder 51 and, in parallel, to a second valve 72 for the second adjusting cylinder 52. In a corresponding manner, the hydraulic pump 66 is also connected via a fourth line 84 at high pressure HD to the first valve 71 for the first adjusting cylinder 51 and, in parallel, to the second valve 72 for the second adjusting cylinder 52. A first pressure limiting valve 75 is also arranged between the third and fourth lines 83, 84, via which pressure limiting valve the high pressure HD can be set. The first and second valves 71, 72 are each designed as electromagnetically actuatable two-way valves, in which in the currentless state the working connection thereof is connected to the third line 83 at low pressure ND. Therefore, in a currentless state, such as e.g. in event of a malfunction, the valves 71, 72 move to their inoperative position and connect the tank 67 at low pressure ND to the first and second adjusting cylinders 51, 52. In an actuated or energised state, the valves 71, 72 connect the fourth line 84 at high pressure HD to the first and second adjusting cylinders 51, 52 respectively. Thus, during a normal operation, the first and second adjusting cylinders 51, 52 can be moved via the valves 71, 72 to the desired operating states and in the desired sequence.

All valves 71, 72 are arranged in the superstructure 6. Only the two adjusting cylinders 51, 52 and the associated first and second lines 81, 82 are located in the telescoping jib 2. In this case, the first and second lines 81, 82 extend between the superstructure 6 and the securing and locking unit 8 at least partially through two oil feed-throughs in the piston rod 7*a* of the telescoping device 7. In terms of location, this allows easy access to the valves 71, 72 and pressure limiting valves 75, 76 in the superstructure 6 in the event of a malfunction. As a result, an emergency operation is not actually necessary because the valves 71, 72 and pressure limiting valves 75, 76 are easily accessible in the superstructure 6 in the event of a malfunction.

The arrangement of two oil feed-throughs in the piston rod 7*a* of the telescoping device 7 of a telescoping jib 2 is considered to be an independent inventive concept.

The invention claimed is:

1. A vehicle crane having a telescoping jib, said vehicle crane comprising:

a basic box with retractable and extendible inner boxes; and a securing and locking unit comprising a first adjusting cylinder and a second adjusting cylinder that are each configured as unilaterally acting hydraulic cylinders, wherein the first adjusting cylinder is moveable between operating states of unbolted and bolted and is configured with a first spring element and a first line, and wherein the second adjusting cylinder is moveable between operating states of secured and released and is configured with a second spring element and a second line;

wherein the first adjusting cylinder moves locking bolts between the operating states of unbolted and bolted and the second adjusting cylinder moves driving bolts between the operating states of secured and released, and wherein in the event of a malfunction the first adjusting cylinder moves to the operating state of bolted via the first spring element and the second adjusting cylinder moves to the operating state of released via the second spring element.

2. The vehicle crane as claimed in claim 1, wherein the first spring element is allocated to a bottom end of the first adjusting cylinder, the second spring element is allocated to a bottom end of the second adjusting cylinder, the first line is connected only to a rod end of the first adjusting cylinder and the second line is connected only to a rod end of the second adjusting cylinder.

3. The vehicle crane as claimed in claim 2, wherein a first valve is arranged in the first line and a second valve is arranged in the second line, and wherein the first valve and the second valve automatically move to an inoperative position in the event of a malfunction and thereby the first adjusting cylinder moves to the bolted operating state and the second adjusting cylinder moves to the released operating state.

4. The vehicle crane as claimed in claim 3, wherein the first spring element has a higher force level than the second spring element such that with a medium pressure applied to the second line, the second adjusting cylinder moves from the operating state of released to the operating state of secured, and wherein with a high pressure applied to the first line the first adjusting cylinder moves from the operating state of bolted to the operating state of unbolted.

5. The vehicle crane as claimed in claim 4, wherein the first valve and the second adjusting cylinder are mechanically locked via a lock member such that the first valve is locked for movement to its inoperative position as long as the second adjusting cylinder is in the operating state of released.

6. The vehicle crane as claimed in claim 5, wherein the vehicle crane has a telescoping drive device, the first line and the second line are connected to a common seventh line and the seventh line is guided through the telescoping drive device.

7. The vehicle crane as claimed in claim 5, wherein the vehicle crane has a telescoping drive device and the first line and the second line are each guided separately through the telescoping drive device.

8. The vehicle crane as claimed in claim 5, wherein the vehicle crane has a superstructure and the first and second valves are arranged in the superstructure.

9. The vehicle crane as claimed in claim 1, wherein a first valve is arranged in the first line and a second valve is arranged in the second line, and wherein the first valve and the second valve automatically move to an inoperative position in the event of a malfunction and thereby the first adjusting cylinder moves to the bolted operating state and the second adjusting cylinder moves to the released operating state.

10. The vehicle crane as claimed in claim 9, wherein the first valve and the second adjusting cylinder are mechanically locked via a lock member such that the first valve is locked for movement to its inoperative position as long as the second adjusting cylinder is in the operating state of released.

11. The vehicle crane as claimed in claim 9, wherein the vehicle crane has a superstructure and the first and second valves are arranged in the superstructure.

12. The vehicle crane as claimed in claim 1, wherein the first spring element has a higher force level than the second spring element such that with a medium pressure applied to the second line, the second adjusting cylinder moves from the operating state of released to the operating state of secured, and wherein with a high pressure applied to the first line the first adjusting cylinder moves from the operating state of bolted to the operating state of unbolted.

13. The vehicle crane as claimed in claim 12, wherein a first valve and the second adjusting cylinder are mechanically locked via a lock member such that the first valve is locked for movement to an inoperative position as long as the second adjusting cylinder is in the operating state of released.

14. The vehicle crane as claimed in claim 1, wherein the vehicle crane has a telescoping drive device, the first line and the second line are connected to a common seventh line and the seventh line is guided through the telescoping drive device.

15. The vehicle crane as claimed in claim 1, wherein the vehicle crane has a telescoping drive device and the first line and the second line are each guided separately through the telescoping drive device.

16. A vehicle crane having a telescoping jib, said vehicle crane comprising:

a basic box with retractable and extendible inner boxes; and a securing and locking unit comprising a first adjusting cylinder and a second adjusting cylinder that are each configured as unilaterally acting hydraulic cylinders, wherein the first adjusting cylinder is moveable between operating states of unbolted and bolted and is configured with a first spring element and a first line, and wherein the second adjusting cylinder is moveable between operating states of secured and released and is configured with a second spring element and a second line;

wherein the first adjusting cylinder moves locking bolts between the operating states of unbolted and bolted and the second adjusting cylinder moves driving bolts between the operating states of secured and released, and wherein in the event of a malfunction the first adjusting cylinder moves to the operating state of bolted and the second adjusting cylinder moves to the operating state of released;

wherein a first valve is arranged in the first line and a second valve is arranged in the second line, and wherein the first valve and the second valve automatically move to an inoperative position in the event of a malfunction and thereby the first adjusting cylinder moves to the bolted operating state and the second adjusting cylinder moves to the released operating state.

17. The vehicle crane as claimed in claim 16, wherein the first valve and the second adjusting cylinder are mechanically locked via a lock member such that the first valve is locked for movement to its inoperative position as long as the second adjusting cylinder is in the operating state of released.

18. A vehicle crane having a telescoping jib, said vehicle crane comprising:

a basic box with retractable and extendible inner boxes; and a securing and locking unit comprising a first adjusting cylinder and a second adjusting cylinder that are each configured as unilaterally acting hydraulic cylinders, wherein the first adjusting cylinder is moveable between operating states of unbolted and bolted and is configured with a first spring element and a first line, and wherein the second adjusting cylinder is moveable between operating states of secured and released and is configured with a second spring element and a second line;

wherein the first adjusting cylinder moves locking bolts between the operating states of unbolted and bolted and the second adjusting cylinder moves driving bolts between the operating states of secured and released, and wherein in the event of a malfunction the first adjusting cylinder moves to the operating state of bolted and the second adjusting cylinder moves to the operating state of released;

wherein the first spring element has a higher force level than the second spring element such that with a medium pressure applied to the second line, the second adjusting cylinder moves from the operating state of released to the operating state of secured, and wherein with a high pressure applied to the first line the first adjusting cylinder moves from the operating state of bolted to the operating state of unbolted.

19. The vehicle crane as claimed in claim 18, wherein a first valve and the second adjusting cylinder are mechanically locked via a lock member such that the first valve is locked for movement to an inoperative position as long as the second adjusting cylinder is in the operating state of released.

* * * * *